United States Patent
Murakami et al.

(10) Patent No.: US 7,017,978 B2
(45) Date of Patent: Mar. 28, 2006

(54) SHOCK ABSORPTION PAD FOR A VEHICLE

(75) Inventors: Takeshi Murakami, Toyota (JP); Taku Fukuyama, Ikoma (JP); Takaharu Okada, Nagoya (JP)

(73) Assignees: Toyota Jidosha Kabushiki Kaisha, Toyota (JP); Sekisui Kaseihin Kogyo Kabushiki Kaisha, Osaka (JP); Chugai Co., Ltd., Nagoya (JP)

( * ) Notice: Subject to any disclaimer, the term of this patent is extended or adjusted under 35 U.S.C. 154(b) by 0 days.

(21) Appl. No.: 10/507,587

(22) PCT Filed: Mar. 28, 2003

(86) PCT No.: PCT/JP03/04037

§ 371 (c)(1),
(2), (4) Date: Sep. 13, 2004

(87) PCT Pub. No.: WO03/086821

PCT Pub. Date: Oct. 23, 2003

(65) Prior Publication Data

US 2005/0104414 A1    May 19, 2005

(30) Foreign Application Priority Data

Mar. 29, 2002 (JP) .............................. 2002-097231

(51) Int. Cl.
*B60N 3/06* (2006.01)
*B60R 21/04* (2006.01)

(52) U.S. Cl. ................. 296/187.05; 296/75; 296/97.23; 280/751

(58) Field of Classification Search ........... 296/187.05, 296/97.23, 187.09, 75, 39.1; 180/90.6; 280/751
See application file for complete search history.

(56) References Cited

U.S. PATENT DOCUMENTS

| 2,680,385 | A | * | 6/1954 | Estin ............................. 74/564 |
| 2,810,672 | A | * | 10/1957 | Taylor ......................... 428/138 |
| 3,047,088 | A | * | 7/1962 | Murrell ...................... 180/90.6 |
| 4,262,048 | A | * | 4/1981 | Mitchell ....................... 428/99 |
| 4,726,438 | A |   | 2/1988 | Stuertz et al. |
| 6,070,905 | A | * | 6/2000 | Renault ...................... 280/751 |
| 6,224,133 | B1 | * | 5/2001 | Abramoski et al. ........... 296/75 |
| 6,224,134 | B1 | * | 5/2001 | Johnson et al. ............... 296/75 |
| 6,247,745 | B1 | * | 6/2001 | Carroll et al. .............. 188/371 |
| 6,257,645 | B1 | * | 7/2001 | Kraimer et al. .......... 296/97.23 |
| 6,502,905 | B1 | * | 1/2003 | Cheris et al. .......... 297/423.46 |

(Continued)

FOREIGN PATENT DOCUMENTS

JP    U 56-22118    7/1979

(Continued)

*Primary Examiner*—Patricia L. Engle
*Assistant Examiner*—Greg Blankenship
(74) *Attorney, Agent, or Firm*—Oliff & Berridge, PLC (57) ABSTRACT

The present invention the related to a shock absorption pad for a vehicle for protecting occupant's lower legs. The shock absorption pad according to the present invention on which an occupant's foot is placed is attached on a surface of a toe board. The shock absorption pad includes a first shock absorption layer provided on the occupant's foot-placing side for absorbing an impact generated in a boundary region at which an energy absorption load of a vehicle body becomes different in a deformation process of the vehicle body at a vehicle crash, and a second shock absorption part provided on the toe board's side for absorbing an impact generated in a region in which the energy absorption load is high.

8 Claims, 6 Drawing Sheets

U.S. PATENT DOCUMENTS

6,634,694 B1 * 10/2003 Matsushita .................. 296/75
6,679,544 B1 * 1/2004 Hubbert et al. ........ 296/187.05

FOREIGN PATENT DOCUMENTS

| JP | U 63-67347 | 5/1988 |
| JP | A 5-330341 | 12/1993 |
| JP | B2 6-17097 | 3/1994 |
| JP | U 6-81848 | 11/1994 |
| JP | A 7-16867 | 1/1995 |
| JP | A 7-25235 | 1/1995 |
| JP | A 9-86255 | 3/1997 |
| JP | A 9-263168 | 10/1997 |
| JP | A 10-297343 | 11/1998 |
| JP | A 10-297345 | 11/1998 |
| JP | A 2000-103367 | 4/2000 |
| JP | A 2000-326870 | 11/2000 |
| JP | A 2001-163107 | 6/2001 |

* cited by examiner

SHOCK ABSORPTION PAD FOR A VEHICLE

TECHNICAL FIELD

The invention relates to a shock absorption pad for use in a vehicle for protecting occupant's lower legs at the time of a vehicle crash, and more specifically relates to a shock absorption pad for use in a vehicle having a stepwise shock absorption characteristic.

BACKGROUND ART

Concerning the structure for protecting occupant's lower legs, JP, 2000-103367, A and JP, 2000-326870, A disclose inventions, wherein the structure of a vehicle itself is configured to have the desired shock absorption characteristic. Further, JP, 5-330341, A and JP, 6-17097, B, disclose inventions, wherein the foam material that absorbs energy is arranged in foot resting portions in the cabin so as to protect the occupant's lower legs.

However, giving a desired shock absorbent function to the structure of the vehicle itself involves design changes of vehicle body structure and may require additional material and parts to achieve the desired shock absorbent function. So it is predicted to increase the cost.

Moreover, in the case of using a shock absorption material, such as a foam material, since the shock absorption characteristic is fixed, the impact load whose magnitude varies in the deformation process of the vehicle body at the time of a vehicle crash cannot be absorbed effectively.

The energy absorption load of the vehicle in the deformation process at the time of a vehicle crash is highly set up in a rear portion of a front side member rather than in a front portion of the front side member, or is highly set up in an inclined portion that extends from the rear end of the front side member backward and downward along the surface of a toe board of a lower dash panel.

Therefore, the deceleration that acts on the vehicle body becomes suddenly high for a short time interval in the boundary region where the energy absorption load in the rear portion or the inclined portion changes in the direction that becomes high. Then, the rear portion or the inclined portion will deform under the set-up energy absorption load to absorb energy.

In this case, the vehicle after the crash can be stopped by virtue of the high energy absorption load due to the deformation of the rear portion or the inclined portion. At this time, the impact on occupant's lower legs can be reduced by shock absorption material, such as a foam material. However, it is difficult to achieve adequate compatibility between this reduction and the reduction of the impact force which becomes suddenly high for a short time interval in the boundary region at which the energy absorption load of the vehicle body changes.

For the solution to this problem, it is conceivable that by changing the structure of the vehicle body, the energy absorption load difference is made small so as to attain the smooth energy absorption load characteristic. However, this will result in increased manufacturing cost of the body structure.

DISCLOSURE OF INVENTION

It is a general object of the present invention to provide a shock absorption pad for use in a vehicle that can reduce more effectively the various shocks applied to occupant's lower legs without significantly changing the body structure.

A more specific object of the present invention is to provide the shock absorption pad for a vehicle, which is equipped with the shock absorption characteristic configured to be variable in a multi-stepped manner according to the various shocks that act on occupant's lower legs, whereby the shock applied to occupant's lower legs can be reduced more effectively.

In order to achieve the above-mentioned objects, there is provided according to the present invention a shock absorption pad for a vehicle which is attached on a surface of a toe board and on which an occupant's foot is placed, comprising: a first shock absorption part provided on the occupant's foot-placing side for absorbing an impact force generated in a boundary region at which an energy absorption load of a vehicle body becomes different in a deformation process of a vehicle body at a vehicle crash; and a second shock absorption part provided on the toe board's side for absorbing an impact generated in a region in which the energy absorption load is high.

According to this arrangement, since the shock absorption pad is provided with two shock absorption parts whose shock absorption characteristics are different from each other, different types of impact loads applied on occupant's lower legs, which are generated in the course of a vehicle body's deformation process, can be effectively reduced by these two shock absorption parts, respectively. That is, the impact, which becomes suddenly high for a short time in the boundary region in which the energy absorption load of vehicle becomes different, can be absorbed by the deformation of the first shock absorption part, whereby the shock over occupant's lower legs which is likely to become momentarily high can be reduced. Then, the impact generated second in the region in which the energy absorption load of the vehicle body becomes high can be absorbed by the deformation of the second shock absorption part, whereby the shock over occupant's lower legs can be reduced. Especially, since the first shock absorption part is provided on the side on which occupant's legs may be laid, the shock absorption characteristic can easily be tuned so that it adapts to the impact that reaches its peak suddenly for a short time in the boundary region in which the energy absorption load of vehicle becomes different.

It is noted that the above-mentioned shock absorption pad has the characteristic such that an amount of deformation per unit load in a direction perpendicular to the surface of the toe board is lower in the second shock absorption part than in the first shock absorption part.

Further, according to the shock absorption pad, wherein the first shock absorption part is divided in a plane over the occupant's foot-placing area so as to lower an in-plane rigidity of the first shock absorption part during its compressive deformation, and an energy absorption load per unit area of the first shock absorption part is set lower than that of the second shock absorption part, it becomes possible to form the shock absorption parts whose shock absorption characteristics are different from each other. That is, as the result of lowering an in-plane rigidity of the first shock absorption part, the first shock absorption part becomes easy to deform in a good follow-up manner enough to absorb the impact that reaches its peak suddenly for a short time in the boundary region of the energy absorption load of vehicle body, whereby the respective shocks over occupant's lower legs can be advantageously absorbed, respectively.

Further, according to the shock absorption pad, wherein the first shock absorption part is comprised of a plurality of projections formed all over the occupant's foot-placing area on an upper surface of the second shock absorption part, it becomes possible to advantageously absorb the respective shocks over occupant's lower legs, respectively. Furthermore the tuning of the compression load characteristic of each projection for implementing the aforementioned desired shock absorption characteristic becomes easy.

Further, according to the shock absorption pad, wherein the first and second shock absorption parts are formed from a foam-molded element and are formed by one of multi-layering foam-molded elements, laminating foam-molded elements with an adhesive, and an integral foam-molding, it becomes possible to advantageously absorb the respective shocks over occupant's lower legs, respectively, with a simple arrangement. In the case of adopting an integral foam-molding process among others, since it is possible to integrally foam-molding the shock absorption pad in a metallic mold, the shock absorption pad with the aforementioned desired shock absorption characteristic can be produced in volume at low cost.

Additionally, in the case of the shock absorption pad being a foam-molded component made from a styrene modified polyethylene resin, advantageous effects resulting from the characteristic peculiar to styrene modified polyethylene resin, such as outstanding dimensional stability and form retention characteristic, good shock absorption characteristic, and the characteristic of being difficult to generate wear powder and undesired noise against rubbing, can be gained.

Other objects, features and advantages of the present invention will become more apparent from the following detailed description when read in conjunction with the accompanying drawings.

BEST MODE FOR CARRYING OUT THE INVENTION

Hereafter, the preferred embodiments according to the present invention are explained with reference to the drawings.

Figure 1A:
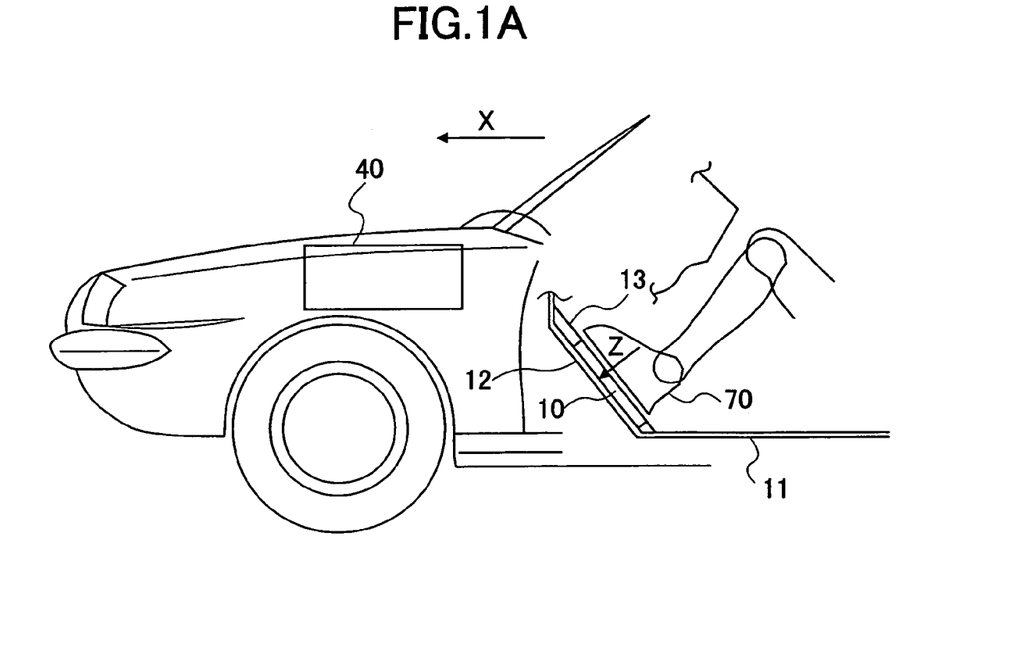
FIG. 1A is a cross-sectional view for diagrammatically illustrating the assembled state of the shock absorption pad 10 according to the present invention.
Figure 1B:
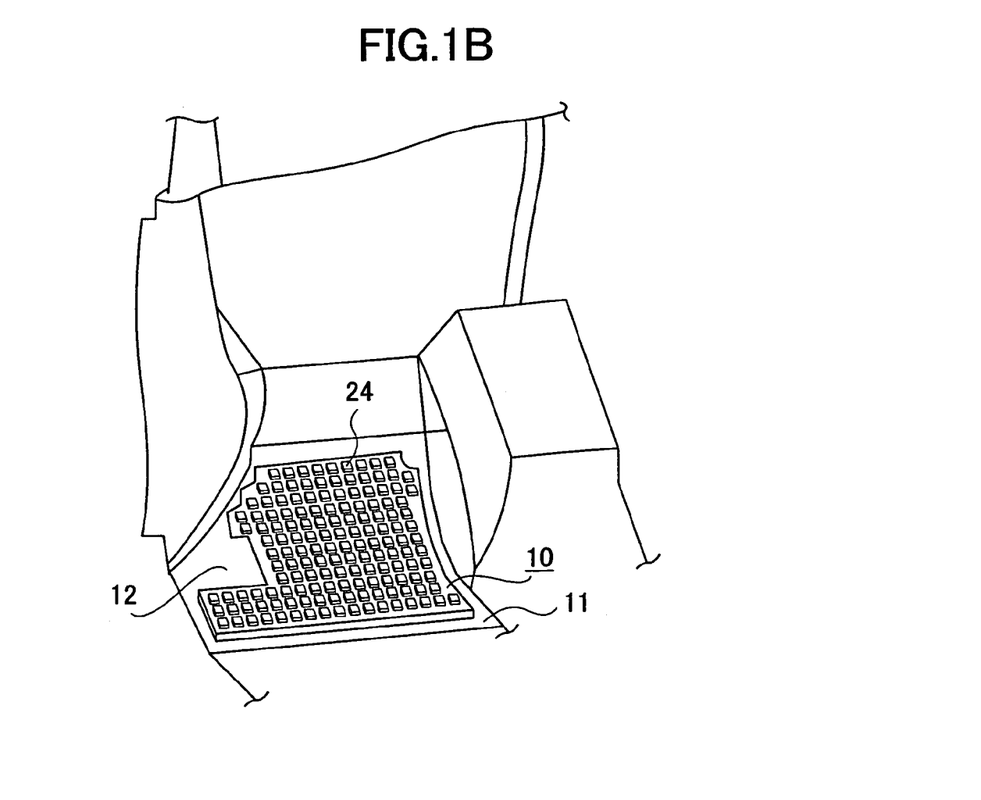
FIG. 1B is a perspective view for illustrating the assembled state of the shock absorption pad 10 in more detail.

FIG. 1A is a cross-sectional view for diagrammatically illustrating the shock absorption pad 10 according to the present invention, which is assembled in a vehicle body in place, seen from the vehicle side. FIG. 1B is a perspective view for illustrating the installed shock absorption pad 10 in more detail.

The shock absorption pad 10 is disposed on a toe board 12 that extends forward and upward in a slanting direction from the front end of the floor panel 11 (arrow X shown in FIG. 1A indicates the front direction). The toe board 12 defines an inclined area (hereafter, this inclined area is referred as "foot-placing area") on which occupant's legs 70 are to be placed, as shown in FIG. 1A. Generally, the shock absorption pad 10 is placed in the above-mentioned foot-placing area of the toe board 12 and attached to the toe board 12 with clips, etc. Generally, the shock absorption pad 10 is covered with a floor carpet 13 on which occupant's legs 70 are to be placed directly.

Figure 2A:
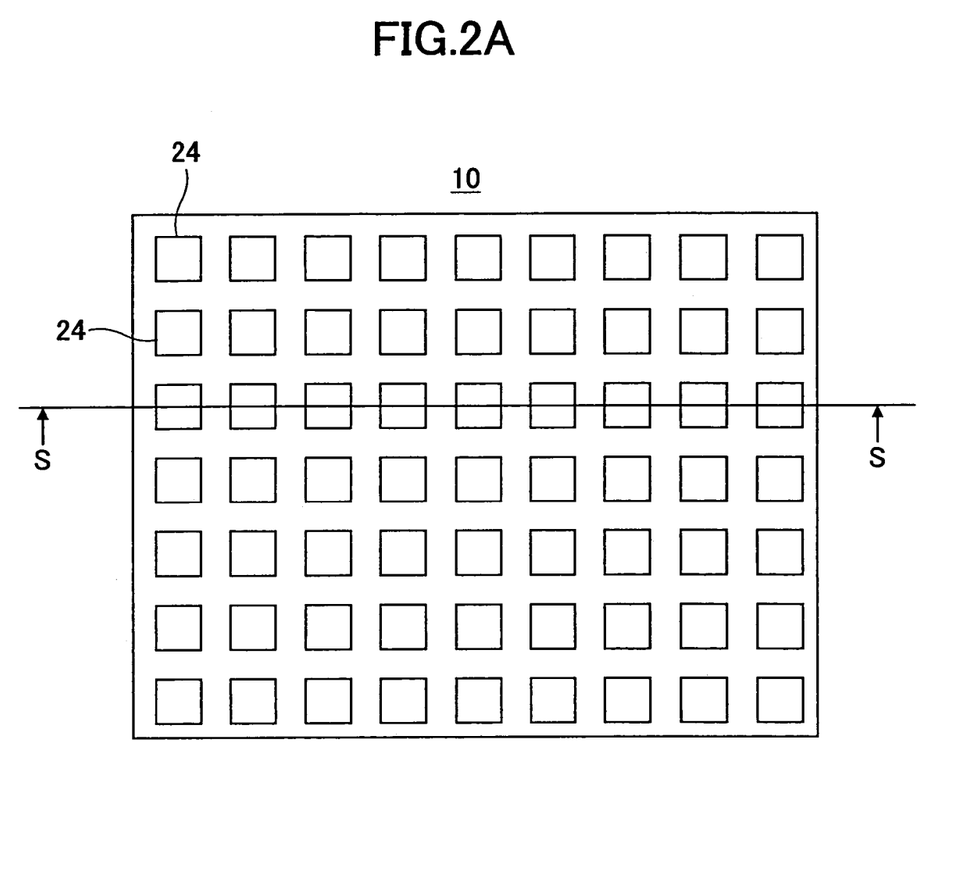
FIG. 2A is a plan view of the shock absorption pad 10 according to the present invention.
Figure 2B:
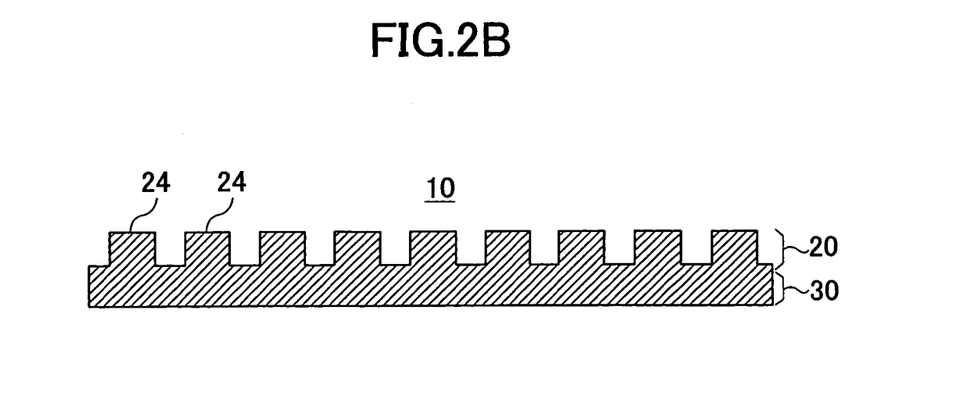
FIG. 2B is a cross-sectional view taken on the line S—S of FIG. 2A.

FIG. 2 is a diagram showing the shock absorption pad 10 according to the present invention, wherein FIG. 2A is a plan view of the shock absorption pad 10, and FIG. 2B is a view taken on line S—S of FIG. 2A. It is noted that the shock absorption pad 10 shown in FIG. 2A has an outside shape different from that of the shock absorption pad 10 shown in FIG. 1B.

As shown in FIG. 2B, the shock absorption pad 10 according to the present invention has a first shock absorption layer 20 on the side on which occupant's legs 70 are put, and has a second shock absorption layer 30 on the toe board 12 side. These shock absorption layers 20 and 30 may be integrally formed from synthetic resin foam, such as polystyrene-based resin, polyethylene-based resin, polypropylene-based resin, polyester-based resin, and styrene modified polyethylene resin, or flexible material, such as urethane and rubber.

However, the shock absorption pad 10 is preferably formed from styrene modified polyethylene resin. Styrene modified polyethylene resin is obtained by impregnated polymerization of the styrene system monomer with a polyethylene system resin particle. Styrene modified polyethylene resin contains a styrene ingredient in the range from 40 to 90 wt %, more preferably, contains a styrene ingredient in the range from 50 to 85 wt %, most preferably contains a styrene ingredient in the range from 55 to 75 wt %.

Here, the foam-molded component made of styrene modified polyethylene resin has an advantage over the foam-molded component made of polyethylene based resin or polypropylene based resin in terms of dimensional stability and form maintenance characteristic because of the general characteristics of styrene modified polyethylene resin. Moreover, when compared under the same condition of an expansion ratio, the foam-molded component made of styrene modified polyethylene resin can absorb a large amount of shock. Furthermore, unlike the foam-molded component of polystyrene based resin, the foam-molded component of styrene modified polyethylene resin resists becoming brittle and thus cannot break easily. Furthermore, the foam-molded component of styrene modified polyethylene resin generates neither an undesired noise nor wear powder due to rubbing.

Therefore, the styrene modified polyethylene resin which has the above advantageous characteristics is considered as a suitable material for the shock absorption pad 10, since the shock absorption pad is required to demonstrate the effective shock absorption characteristic in a limited thickness and a limited size and is disposed at the floor portion in the cabin on which occupant's legs are put.

The first shock absorption layer 20 of the shock absorption pad 10 includes a plurality of projections 24 formed on the second shock absorption layer 30. These projections 24 are formed within the area corresponding to the above-mentioned foot-placing area, and are preferably formed substantially all over the area corresponding to the foot-placing area. As shown in FIG. 2A, these projections 24 may be arranged in a lattice pattern so as to form channels in the shape of a cross when seen from above. In addition, these projections 24 may be arranged at regular interval spacing where each projection 24 is spaced from its adjacent projection 24 at a constant distance. Further, these projections 24 may be arranged in a staggered configuration by making each of projections 24 staggered in a longitudinal or lateral direction.

Moreover, each of these projections 24 may have various outside shapes, such as a square, a rectangle, a circle, an ellipse, etc. Moreover, each projection 24 does not need to have a constant cross-section along the projection direction. Furthermore, the tip of each projection 24 may be configured so that it may be pressed by occupant's soles at a surface or a point.

Moreover, the size and arrangement of each projection 24 may be determined so that an occupant's sole can be supported by several projections 24. The total area of the projections 24 to be pressed by an occupant's sole may correspond to 30–60% of a footprint of an average occupant, and the area of each projection 24 may be in the range from about 200 $mm^2$ to about 600 $mm^2$. Moreover, projections 24 may have a height difference locally and the height of some projections 24 may be different from that of other projections 24.

However, the shock absorption characteristic of the shock absorption pad 10 is dependent on various factors, such as a material property of the shock absorption pad 10, and the thickness of each shock absorption layers 20 and 30. So it should be understood that the shock absorption pad with outside shape, arrangement, and size, etc., not specified above is within the limits of this invention insofar as it has the shock absorption characteristic as mentioned below.

Figure 3:
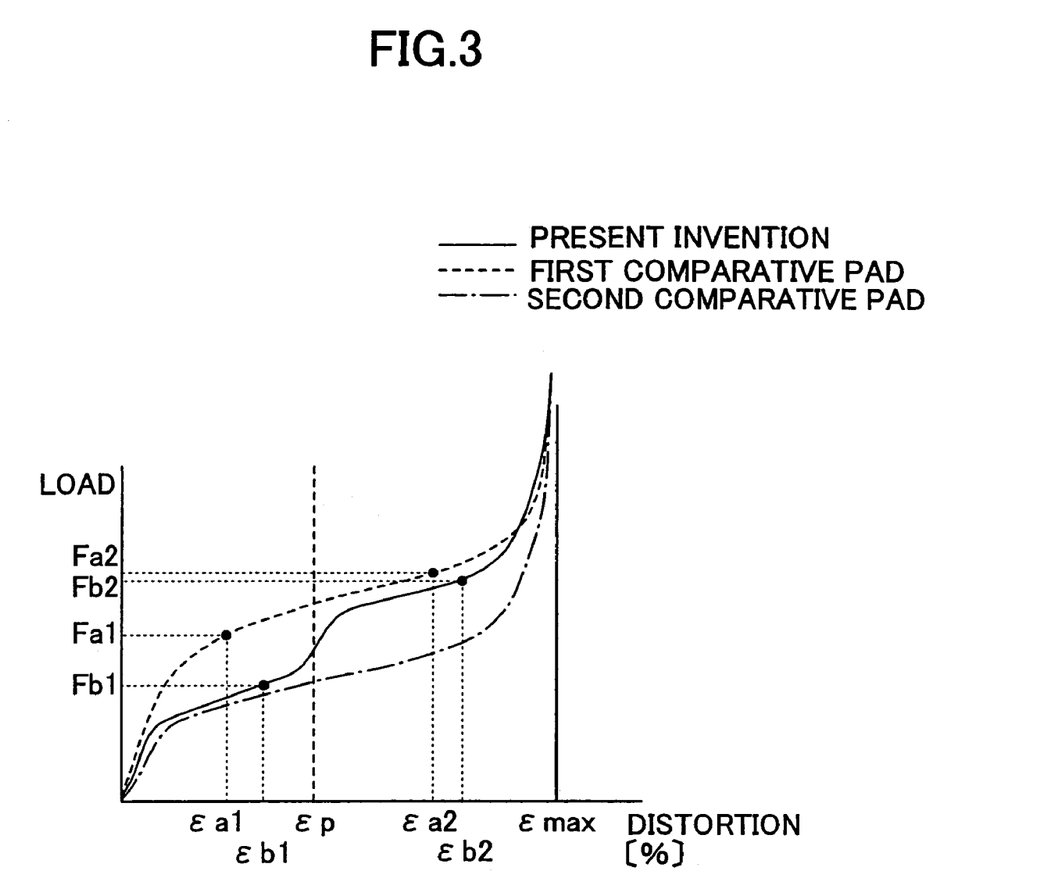
FIG. 3 is a diagram for showing a test result as to a shock absorption characteristic of the shock absorption pad 10 according to the present invention.

FIG. 3 is a diagram for explaining the shock absorption characteristic of the shock absorption pad 10 according to the present invention, in which a load-distortion curve of the shock absorption pad 10 according to the present invention is shown. The load-distortion curves of other shock absorption pads are also shown for contrast. Specifically, the load-distortion curve of the first comparative pad is indicated by a broken line, which first comparative pad is formed from the same material as the shock absorption pad 10 according to the present invention but doesn't have the projections 24. The load-distortion curve of the second comparative pad is indicated by a chain double-dashed line, which second comparative pad is formed from a material softer than the material used for the shock absorption pad 10 according to the present invention and doesn't have the projections 24. It is noted that these load-distortion curves are based on the measurements made on a test piece of each shock absorption pad using appropriate measuring and testing equipment. It is also noted that these load-distortion curves indicate the distortion characteristic of each shock absorption pad against the compression load along the direction perpendicular to the toe board 12 (see the direction Z in FIG. 1A).

As shown in FIG. 3, the load-distortion curve (solid line) of the shock absorption pad 10 according to the present invention changes significantly at the predetermined distortion level $\epsilon_p$. This means that the load-distortion characteristic of the shock absorption pad 10 according to the present invention varies in a multi-stepped manner (in this embodiment, a two-stepped manner) at the predetermined distortion level $\epsilon_p$. That is, the shock absorption pad 10 according to the present invention exhibits a shock absorption characteristic which is equivalent to that of the second comparative pad when deformation of the first shock absorption layer 20 begins, and exhibits a shock absorption characteristic equivalent to the first comparative pad when deformation of the first shock absorption layer 20 is completed and deformation of the second shock absorption layer 30 begins. In other words, with virtue of a plurality of projections 24, the first shock absorption layer 20 can have the shock absorption characteristic equivalent to the second comparative pad that is formed from comparatively soft material, even though the first shock absorption layer 20 is formed from the same material as the first comparative pad.

The inventors of the present invention carried out the crash examination using a real vehicle equipped with the shock absorption pad 10 in order to verify the effect of the shock absorption pad 10 equipped with the step-wise shock absorption characteristic, and obtained the following results.

Figure 4:
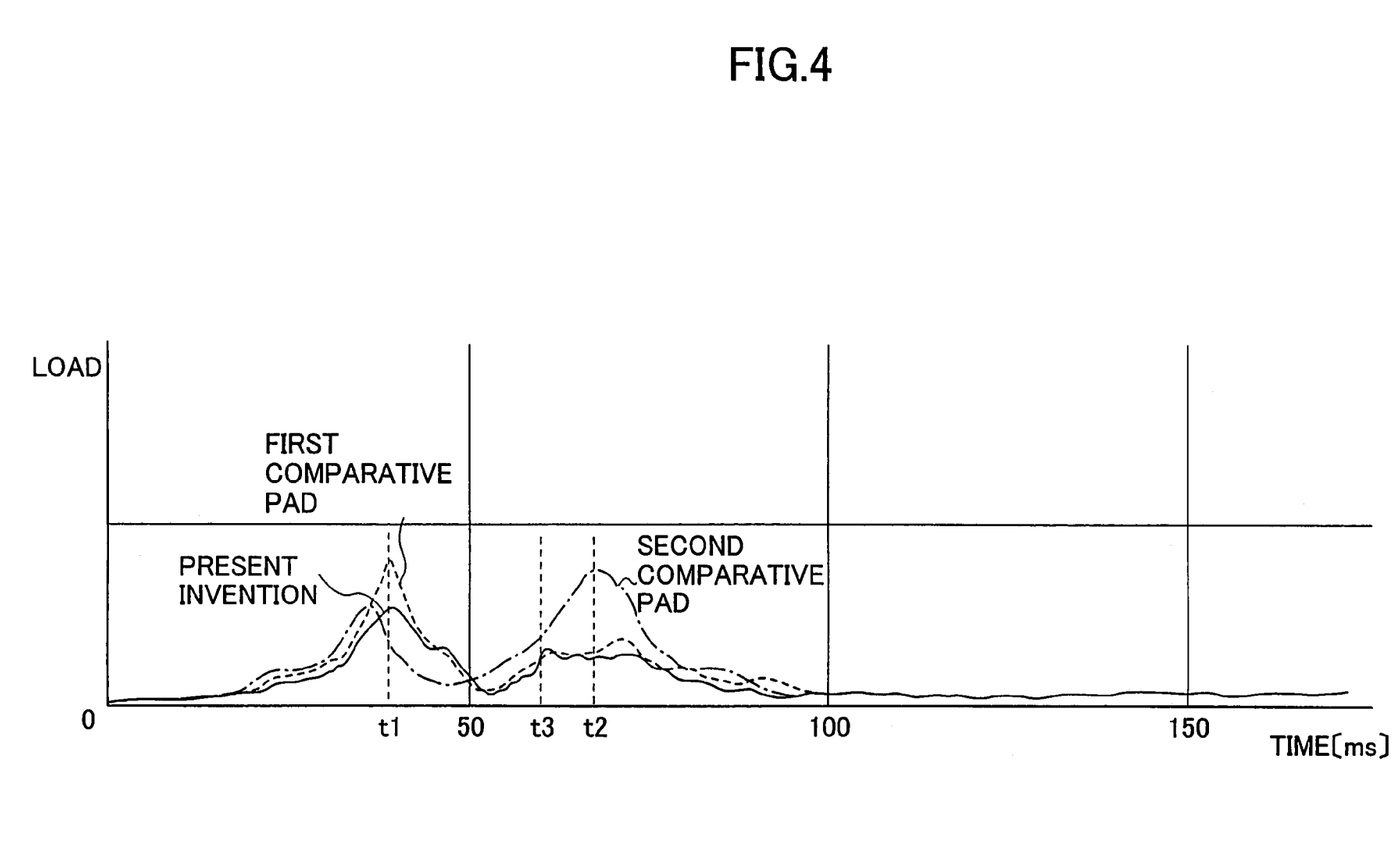
FIG. 4 is a diagram for showing the load data on a time series picked up at the lower leg portion of a dummy through a real vehicle crash examination.

FIG. 4 shows the load data on the time series picked up at the lower leg portion of a dummy through the real vehicle crash examination. In FIG. 4, time t=0 is the time of the moment the vehicle's front end came into contact with the barrier. In FIG. 4, the measurement data (dotted line) of the first comparative pad and the measurement data (chain double-dashed line) of the second comparative pad are also shown as contrast. Hereafter, the examination result shown in FIG. 4 will be discussed with reference to the FIG. 5 that diagrammatically shows the vehicle's deformation process at the time of vehicle crash, and FIG. 3.

When the vehicle crash begins at time t=0, at first the engine room part 40 (see FIG. 1A) begins to deform. Then, when the deformation of the engine room part 40 advances gradually, the load on the lower legs of the dummy begins to increase. Then, the load on the dummy's lower legs reaches the first peak value at the time t=t1 when the deformation of the engine room part 40 has substantially reached its full potential. Hereafter, this crash stage is referred as "first impact".

As shown in FIG. 4, the load at the first impact is a momentary shock that is generated over a relatively shorter time interval as compared with the load at the second impact that will be described later. That is, the time interval from start-up time to fall time of the first impact is shorter than that of the second impact. Thus, the energy to be absorbed at the first impact is less than that at the second impact.

Referring to FIG. 4, at the first impact, the load exerted on the dummy's lower legs is higher in the case of using the first comparative pad than in the case of using the shock absorption pad 10 according to the present invention or the second comparative pad. Referring to FIG. 3, this result can be derived from the fact that at the first impact the load $F_{a1}$ corresponding to the distortion $\epsilon_{a1}$ of the first comparative pad is larger than the load $F_{b1}$ corresponding to the distortion $\epsilon_{b1}$ of the shock absorption pad 10 according to the present invention or the second comparative pad. On the other hand, there is substantially no difference in the load exerted on the dummy's lower legs between the case of using the shock absorption pad 10 according to the present invention and the case of using the second comparative pad. This result can be derived from the fact that there is substantially no difference in distortion level between these shock absorption pads at the first impact.

It can be understood from this test result that the deformation of the first comparative pad cannot follow the instantaneous load at the first impact and causes a large load to be transmitted to the dummy's lower legs. To the contrary, the shock absorption pad 10 according to the present invention can deform instantaneously in response to the instantaneous load at the first impact and thus can effectively reduce the load to be transmitted to the dummy's lower legs.

Figure 5A:
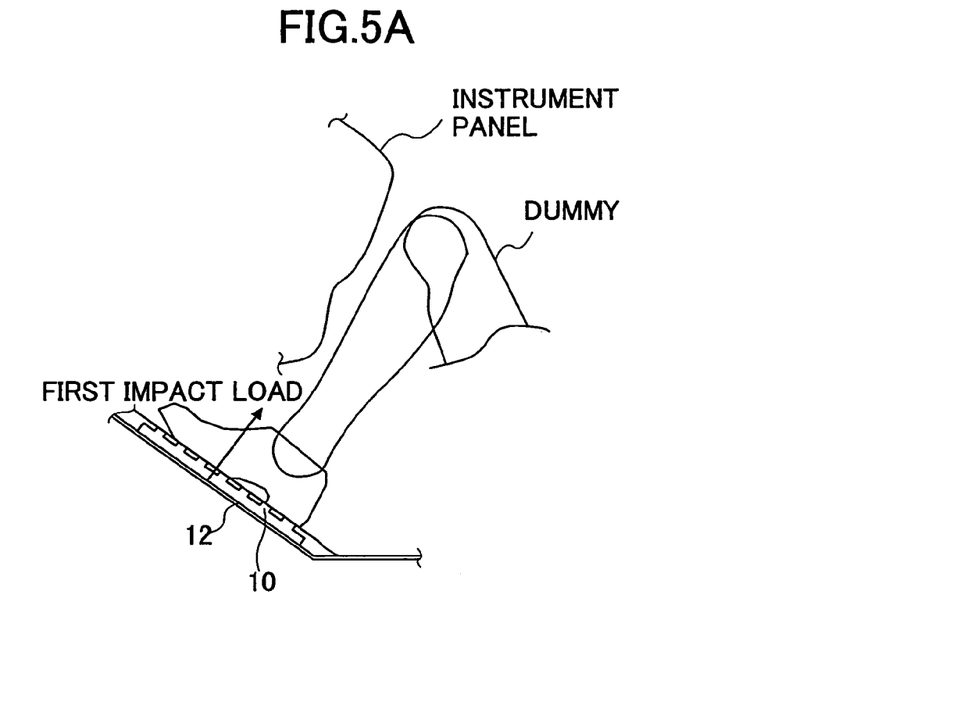
FIG. 5A is a diagram for illustrating the state of the deformed vehicle body at the first impact.
Figure 5B:
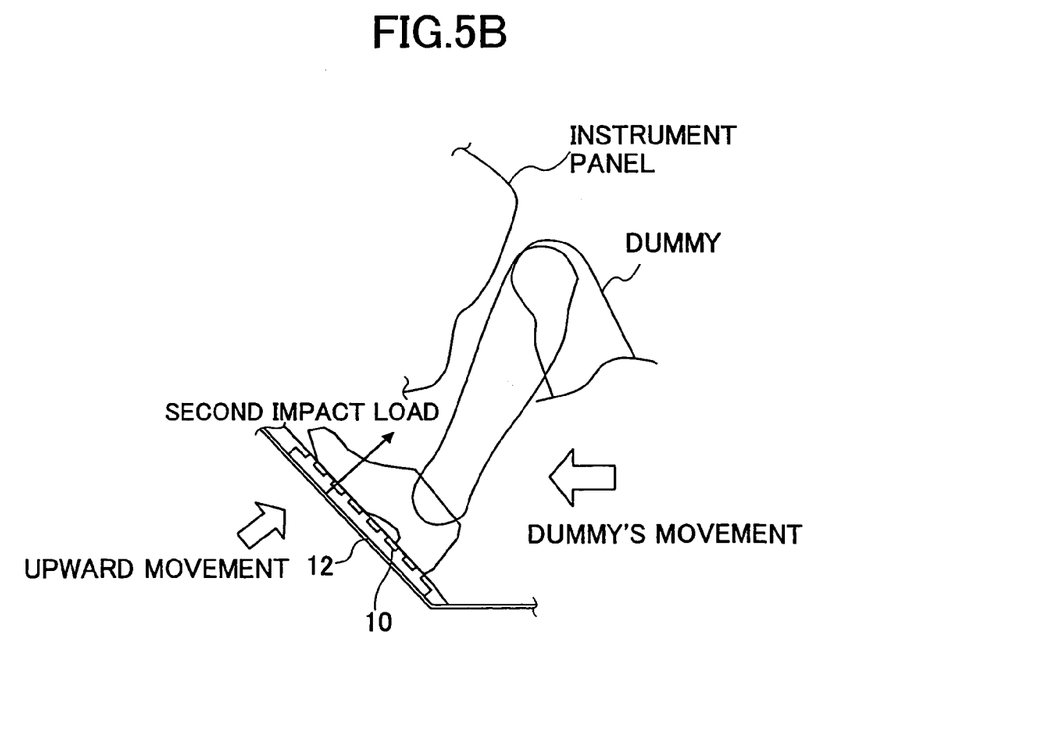
FIG. 5B is a diagram for illustrating the state of the deformed vehicle body at the second impact.

Subsequently, after the deformation of the engine room part 40 is completed, the toe board 12 begins to be pushed up and backward, as shown in FIG. 5B. That is, the toe board 12 begins to deform and move such that the sole of a dummy is pushed up. At this time, as the amount of movement of the whole vehicle decreases by the end of deformation of the engine room part 40, the dummy moves forward with respect to the vehicle due to its inertial force. That is, the dummy moves forward with its sole abutted against the toe board 12. Because of these two effects, the load of the dummy's lower legs increases gradually and reaches the second peak value at the time t=t2. Hereafter, this crash stage is referred as "second impact".

The time interval from the beginning of this second impact to its end is longer than the time interval related to the aforementioned first impact. Thus, the energy to be absorbed at the second impact is much greater than that at the first impact.

Referring to FIG. 4, at the second impact, the load exerted on the dummy's lower legs is greater in the case of using the second comparative pad than in the case of using the shock absorption pad 10 according to the present invention or the first comparative pad. Referring to FIG. 3, this result can be derived from the fact that because the second comparative pad absorbs the smallest amount of energy when compared under the same condition of an amount of deformation, it had already deformed beyond its full potential (i.e. its distortion level had reached approximately $\epsilon_{max}$ indicated in FIG. 3) before absorbing all the energy that should be absorbed by the time t=t2. That is, the second comparative pad had entered a state where it cannot deform any more by the time t=t2, and thus the sole of a dummy had substantially entered a state where it was in contact with the rigid body by the time t=t2.

On the other hand, at the second impact, there is substantially no difference in the load exerted on the dummy's lower legs between the case of using the shock absorption pad 10 according to the present invention and the case of using the first comparative pad. Referring to FIG. 3, this result can be derived from the fact that the load $F_{a2}$ corresponding to the distortion $\epsilon_{a2}$ of the first comparative pad at the second impact is substantially equal to the load $F_{b2}$ corresponding to the distortion $\epsilon_{b2}$ of the shock absorption pad 10 according to the present invention at the second impact.

From the above test result, it can be said that the shock absorption pad 10 according to the present invention can achieve the lowest values of load exerted on the dummy's lower legs both at the first impact and at the second impact and protect occupant's lower legs most effectively. This is because at the first impact in which the instantaneous load is generated, the occupant's lower legs are protected by the first shock absorption layer 20, which can easily deform and absorb a small amount of energy per unit area (which unit area includes the area of the first shock absorption layer 20 not provided with projections 24), while at the second impact in which a relatively long-duration load is generated due to the upward movement of the panel in the foot-placing area, the occupant's lower legs are protected by the second shock absorption layer 30, which absorbs a relatively large amount of energy per unit area. Thus, according to the shock absorption pad 10 according to the present invention, since it has the shock absorption characteristic that varies in stages according to the first impact and second impact which occur in stages in the course of the vehicle crash process, it becomes possible to protect occupant's lower legs effectively.

It is noted that the thickness of the first shock absorption layer 20, the number and arrangement of projections, etc., are determined so that the energy at the first impact can be absorbed only by the deformation of the first shock absorption layer 20, while the thickness and area, etc., of the second shock absorption layer 30 are determined so that the second shock absorption layer 30 cannot deform beyond its maximum level at the second impact (i.e. so that the amount of deformation of the second shock absorption layer 30 cannot reach the elastic limit). However, it is also noted that the overall thickness of the shock absorption pad 10 will be subjected to the constraint from the viewpoint of sufficient cabin space.

The shock absorption pad 10 used for the above-mentioned test had a thickness of about 30 mm, the thickness of the first shock absorption layer 20 was about 10 mm, and the total area of the top surfaces of the projections 24 was about 55% of the total area of the shock absorption pad 10. This shock absorption pad 10 showed the desired shock absorption characteristic. That is, during the first impact the shock absorption pad 10 exhibited the shock absorption characteristic equivalent to the first comparative pad, and at the time at which the second impact began (i.e. the time t=t3 in FIG. 4) it deformed at the distortion revel $\epsilon_p$, which corresponds to the transition point of the shock absorption characteristic, and during the second impact it exhibited the shock absorption characteristic equivalent to the second comparative pad without deforming beyond its maximum level. However, these design matters depend on the amount of energies to be absorbed at the first and second impact and thus depend on the structure of the vehicle body. The shock absorption characteristic of the shock absorption pad 10 may be adjusted based on a real crash test, analysis, etc., for every type of vehicle to implement the aforementioned desired shock absorption characteristic.

Here, since the shock absorption pad 10 according to the present invention has a plurality of projections 24 formed in a discrete pattern (i.e. spaced arrangement) as mentioned above, and further has the first shock absorption layer 20 on the side of occupant's legs 70, the adjustment of the shock absorption characteristic for realizing the aforementioned desired characteristic becomes easy and problems arising from normal use can be avoided.

Figure 6A:
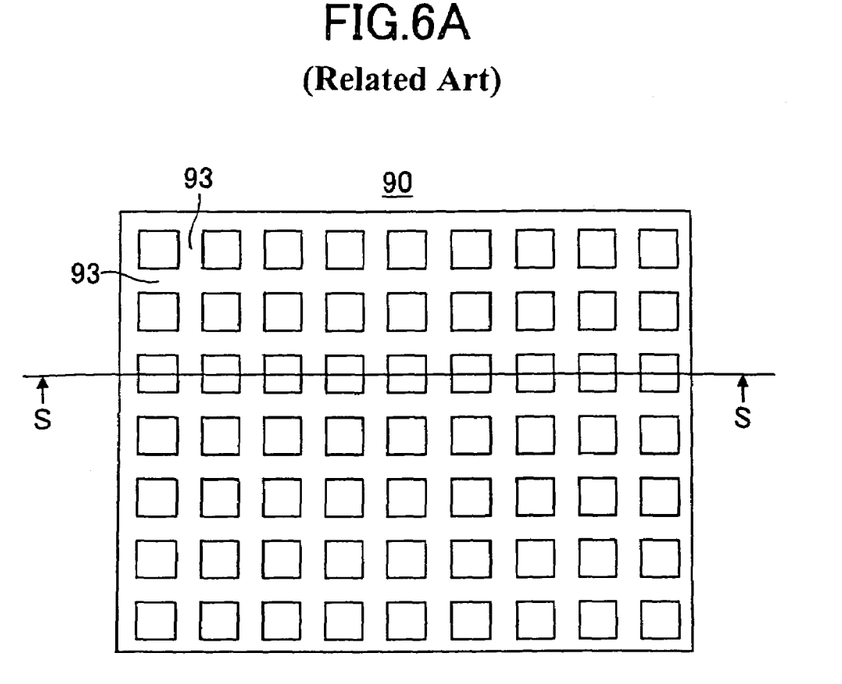
FIG. 6A is a plan view for showing the shock absorption pad 90 as a contrast for the shock absorption pad 10 according to the present invention.
Figure 6B:
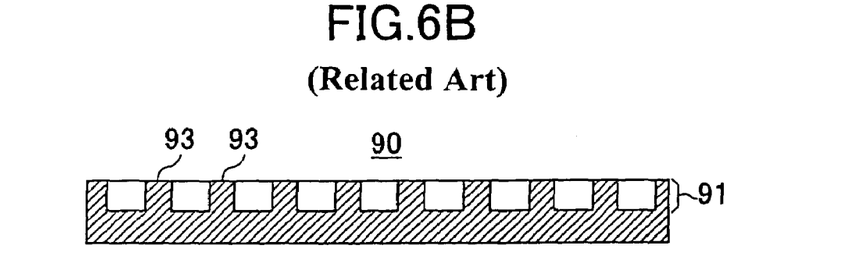
FIG. 6B is a cross-sectional view of the shock absorption pad 90 taken on the line S—S of FIG. 6A.

On the contrary, with reference to FIG. 6A and FIG. 6B, the shock absorption pad 90 equipped with the protruding lines 93 formed in a crisscross pattern is shown. The first shock absorption layer 91 of this shock absorption pad 90 has higher in-plane rigidity as compared with the first shock absorption layer 20 of the present invention equipped with projections 24 not connected with each other in a plane over the foot-placing area, and thus the adjustment of the shock absorption characteristic of the shock absorption pad 90 for realizing the aforementioned desired characteristic becomes complicated. That is, the deformation of the portion of the protruding lines 93 that actually abuts against the sole involves the deformation of the other portion that actually doesn't abut against the sole. So the adjustment of the shock absorption characteristic should be done considering such a deformation characteristic. Furthermore, with such high in-plane rigidity, the first shock absorption layer 91 cannot deform in a good follow-up manner against an instantaneous load such as the above-mentioned first impact load.

Similarly, in the case of the shock absorption pad 95 (not shown) equipped with the first shock absorption layer 20 on the side of the toe board 12 instead of on the side of the occupant's leg 70, the adjustment of the shock absorption characteristic of the shock absorption pad 90 for realizing the aforementioned desired characteristic becomes complicated because all the projections 24 abut against the surface of the toe board 12. That is, the pressure on the shock absorption pad 95 from the sole causes the deformation of substantially all the projections 24 and furthermore there may be a difference in the amount of the deformation between each projection 24. So the adjustment of the shock absorption characteristic of the shock absorption pad 90 for realizing the aforementioned desired characteristic becomes very difficult. Moreover, in the case of realizing the aforementioned desired characteristic, since the compression load per unit projection becomes small, the projections 24 may easily become flat when the occupant's legs 70 press strongly them or when the occupant's legs 70 are placed only on them. In this case, the shock absorption pad 95 will not fully achieve its function in the actual crash because of the flattened projections 24. Moreover, such a shock absorption pad 95 isn't likely to keep its shock absorption characteristic for a long time and thus does not have good durability.

In contrast to this, the shock absorption pad 10 according to the present invention, which is equipped with projections 24 not connected with each other, has the structure in which only some projections 24 which are actually supporting the sole can deform. So the desired shock absorption characteristic is realizable with easy adjustment, setting up a suitable compression load per unit projection so as not to cause the projections 24 to deform easily during normal use.

Further, the present invention is not limited to the above-described embodiments, and variations and modifications may be made without departing from the scope of the present invention.

For example, in the above-mentioned embodiments, although the shock absorption pad 10 according to the present invention is molded in one piece to have the first shock absorption layer 20 and the second shock absorption layer 30, the shock absorption pad 10 may be constituted by forming each shock absorption layer from a different material and by laminating together these shock absorption layers.

In addition, the shock absorption pad 10 according to the present invention may be constituted by forming each shock absorption layer from the same material with different density and by laminating together these shock absorption layers, or may be constituted by laminating together foam-molded absorption layers made from the same kind of or a different kind of synthetic resin. Furthermore, the shock absorption pad 10 according to the present invention may be an integrally-molded component made by expanding the same kind of or a different kind of synthetic resin foaming beads with a different expansion ratio in a metal mold. Although reference is made to the two-stage shock absorption characteristic in the above-mentioned embodiment, it is also possible to realize a three or more stage shock absorption characteristic by forming additional shock absorption layers.

The invention claimed is:

1. A shock absorption pad for a vehicle which is attached on a surface of a toe board and on which an occupant's foot is placed, comprising:
   a first shock absorption part provided on the occupant's foot-placing side for absorbing an impact force generated in a boundary region at which an energy absorption load of a vehicle body becomes different in a deformation process of the vehicle body at a vehicle crash, the first shock absorption part being divided in a plane over the occupant's foot-placing area to lower an in-plane rigidity of the first shock absorption part during a compressive deformation; and a second shock absorption part provided facing the toe board for absorbing an impact generated in a region in which the energy absorption load is high, wherein an energy absorption load per unit area of the first shock absorption part is lower than an energy absorption load per unit area of the second shock absorption part.

2. The shock absorption pad for a vehicle as claimed in claim 1, wherein the first shock absorption part is comprised of a plurality of projections formed all over the occupant's foot-placing area on an upper surface of the second shock absorption part.

3. The shock absorption pad for a vehicle as claimed in claim 2, wherein the first and second shock absorption parts are formed from a foam-molded element and are formed by one of multi-layering foam-molded elements, laminating foam-molded elements with an adhesive, and integral foam-molding.

4. The shock absorption pad for a vehicle as claimed in claim 2, wherein the shock absorption pad is a foam-molded component made from a styrene modified polyethylene resin.

5. The shock absorption pad for a vehicle as claimed in claim 1, wherein the first and second shock absorption parts are formed from a foam-molded element and are formed by one of multi-layering foam-molded elements, laminating foam-molded elements with an adhesive, and integral foam-molding.

6. The shock absorption pad for a vehicle as claimed in claim 1, wherein the shock absorption pad is a foam-molded component made from a styrene modified polyethylene resin.

7. A shock absorption pad for a vehicle which is attached on a surface of a toe board and on which an occupant's foot is placed, wherein the shock absorption pad is a foam-molded component made from a resin and is provided with a plurality of projections on the occupant's foot-placing side, said projections being spaced from each other in a plane over the occupant's foot-placing area to lower an in-plane rigidity of the shock absorption pad on the occupant's foot placing side during a compressive deformation.

8. A vehicle, comprising a toe board and a shock absorption pad, the shock absorption pad comprising:

a first shock absorption part provided on an occupant's foot-placing side for absorbing an impact force generated in a boundary region at which an energy absorption load of a vehicle body becomes different in a deformation process of the vehicle body at a vehicle crash, the first shock absorption part being divided in a plane over the occupant's foot-placing area to lower an in-plane rigidity of the first shock absorption part during a compressive deformation; and a second shock absorption part provided facing the toe board for absorbing an impact generated in a region in which the energy absorption load is high, wherein an energy absorption load per unit area of the first shock absorption part is lower than an energy absorption load per unit area of the second shock absorption part.

* * * * *